United States Patent [19]

Nomura et al.

[11] Patent Number: 5,757,559
[45] Date of Patent: May 26, 1998

[54] LENS HOLDING DEVICE

[75] Inventors: Hiroshi Nomura; Takamitsu Sasaki, both of Tokyo, Japan

[73] Assignee: Asahi Kogaku Kogyo Kabushi Ki Kaisha, Tokyo, Japan

[21] Appl. No.: 496,960

[22] Filed: Jun. 30, 1995

[30] Foreign Application Priority Data

Jul. 5, 1994 [JP] Japan .................. 6-175999

[51] Int. Cl.$^6$ ...................... G02B 7/02
[52] U.S. Cl. ............ 359/819; 359/820; 359/811
[58] Field of Search ............... 359/819, 820, 359/811

[56] References Cited

U.S. PATENT DOCUMENTS

| | | | |
|---|---|---|---|
| 3,904,276 | 9/1975 | Whitaker et al. | 359/820 |
| 4,668,047 | 5/1987 | Okura . | |
| 4,737,017 | 4/1988 | Nagasaka | 359/811 |
| 5,117,311 | 5/1992 | Nomura | 359/819 |
| 5,177,641 | 1/1993 | Kobayashi et al. | 359/820 |
| 5,225,928 | 7/1993 | Dugan | 359/820 |

FOREIGN PATENT DOCUMENTS 680532  2/1964  Canada ................. 359/820

OTHER PUBLICATIONS

Japanese Utility Model Provisional Publication No. HEI 4-13908.

*Primary Examiner*—Loha Ben
*Attorney, Agent, or Firm*—Greenblum & Bernstein P.L.C.

[57] ABSTRACT

A glass lens and a plastic lens are secured such that the glass lens is retained in a predetermined position with reference to a lens barrel and against a reference surface provided in the lens barrel. The plastic lens is held by a resilient ring-shaped portion of the lens barrel against the glass lens, thus locating the plastic lens in a predetermined position with reference to both the lens barrel and the glass lens. The glass lens is retained against the reference surface by a retaining member positioned opposite the reference surface.

23 Claims, 2 Drawing Sheets

LENS HOLDING DEVICE

BACKGROUND OF THE INVENTION

The present invention relates to a lens holding structure, and more specifically a device for holding a plurality of lenses within a lens barrel.

Conventional structures for holding a plurality of lenses in a lens barrel, especially when one or more of the lenses is plastic, use a plurality of retaining members to hold the lenses in place.

For example, known prior art is disclosed in U.S. Pat. No. 5,117,311, and shown herein in FIG. 1. The lens structure disclosed includes a resin plastic lens 1, a glass lens 2, and a resin plastic lens barrel 3 for fixedly holding the lenses 1 and 2. Specifically, the plastic lens 1 is inserted in the barrel 3 from the object side (left hand side in FIG. 1), and fixed thereto by means of a lens securing ring 4. The lens securing ring 4 has a predetermined elasticity, and secures the lens 1 by pressing the lens 1 against an inner stepped portion of the barrel 3. The glass lens 2 is fitted in the barrel 3 from the image side (right hand side of FIG. 1), and is fixed by plastically deforming the edge of the barrel 3 under applied heat. The resin plastic lens 1 is easily deformed under the influence of external forces and/or heat, and its optical characteristics can be changed thereby. For this reason, it is conventionally ill-advised to secure a resin plastic lens 1 by deforming the lens barrel, and an additional securing member, in this case securing ring 4, is necessary

SUMMARY OF THE INVENTION

It is therefore an object of the present invention to provide an improved lens holding device capable of holding a plurality of lenses, without requiring separate retaining structures for resin plastic and glass lenses. It is a further object of the invention to provide an improved lens holding device capable of holding a plurality of lenses, including those made of resin, without using an additional lens retaining member.

In order to achieve the objects of the invention, an improved lens holding device includes a lens frame with a unitary elastic portion and a reference surface formed therein; a retaining member provided on the lens frame; a first lens supported by the lens frame and held against the reference surface by the retaining member (in a predetermined position with reference to the lens frame); and a second lens, supported by the lens frame and elastically held against the first lens by the unitary elastic portion of the lens frame (in a predetermined position with reference to the lens frame and to the first lens).

In this manner, both of the lenses are positioned with reference to a single reference surface, although the second lens is indirectly referenced via the first lens and held in place by the elastic member. Accordingly, only one retaining operation is necessary during assembly to hold both lenses in place and positioned properly.

In one particular case, the second lens includes a resin plastic lens having a known limit of mechanical deformation acceptable for proper optical performance, and the elastic member elastically holds the second lens against the first lens with a force of less than the known limit. Thus, plastic lenses, especially, may benefit from this structure. If the first lens is a glass lens, the combination allows proper and expedient mounting of both.

Optionally, the retaining member is unitarily formed with the lens frame, and the first lens is substantially rigidly held against the reference surface by plastically deforming the lens frame to form the retaining member. In one case, the lens frame is formed from resin, and the lens frame is plastically deformed under heat to form the retaining member. In this way, no additional parts are needed and the entire assembly consists of only the frame and two lenses.

In one particular construction, the lens frame has a stepped bore with portions of greater and lesser inner diameter. First and second lens mounting portions are defined therein, the first lens mounting portion being a greater diameter portion of the stepped bore than the second lens mounting portion. The reference surface is arranged between the first and second lens mounting portions, facing substantially towards the first lens mounting portion. In this case, the first lens may have a greater diameter than the second lens, and the first lens is supported in the first lens mounting portion while the second lens is supported in the second lens mounting portion. Further, the elastic portion may be formed in the lens frame on a side of the second lens mounting portion opposite the reference surface, and the retaining member is provided to the lens frame on a side of the first lens mounting portion opposite the reference surface. Optionally, the elastic portion may be a resilient ring-shaped member of a lesser diameter than second lens mounting portion and the second lens; and the retaining member may be a substantially rigid ring-shaped member of a lesser diameter than the first lens mounting portion and the first lens. Further optionally, a stepped portion of a diameter between that of the first and second lens mounting portions may be arranged between the first and second lens mounting portions, and the reference surface is provided as an annular projection on the stepped portion extending towards the first lens.

With this specific construction, the frame and lenses may be assembled by inserting the first lens followed by the second, and then sealing the frame at the retaining member, providing a particularly easy assembly process.

According to another aspect of the invention, an improved lens holding device has a lens frame with a unitary elastic portion and a reference surface formed therein; a glass lens, having a reference surface formed thereon; a resin lens; and a retaining member, provided to the lens frame. The glass lens is held against the reference surface of the lens frame by the retaining member, and the resin lens is elastically held against the reference surface of the glass lens by the elastic portion. This aspect of the invention allows easy and properly referenced assembly of the glass and plastic lenses, without distortion of the plastic lens and with a minimum of assembly operations. Preferably, the elastic portion is a ring-shaped resilient portion of the lens frame. Further preferably, the glass lens is of larger diameter than the plastic lens. Yet further preferably, the retaining member is unitarily formed with the lens frame, and the first lens is rigidly held against the reference surface by plastically deforming the lens frame to form the retaining member. In this case, the lens frame may be formed from resin, and the lens frame is plastically deformed under heat to form the retaining member.

According to still another aspect of the present invention, a lens holding device includes a lens frame having first and second lens mounting portions formed therein; a reference surface substantially facing the first lens mounting portion and formed between the first and second lens mounting portions; and an elastic ring formed in the lens frame on a side of the first lens mounting portion opposite the second lens mounting portion; a first lens, provided in the first lens mounting portion and abutting the reference surface; a second lens, provided in the second lens mounting portion and resiliently held abutting the first lens by the elastic ring; and a retaining portion, provided on a side of the second lens mounting portion opposite the first lens mounting portion, and holding the first lens abutting the reference surface.

In this manner, the first lens is placed into the frame and is biased by the elastic ring. Then, the second lens is placed into the frame to abut both the reference surface and the first lens, and both lenses are then retained in place by the retaining portion. Thus, both lenses are properly positioned by only one retaining operation. Preferably, the first lens is of greater diameter than the second lens, and the first lens mounting portion is of greater internal diameter than the second lens mounting portion. In this way, the resulting stepped structure is used to facilitate assembly. Optionally, the retaining portion is unitarily formed with the lens frame, and the first lens is held against the reference surface by plastically deforming the lens frame to form the retaining portion. In this case, the lens frame is preferably formed from resin, and the lens frame is plastically deformed under heat to form the retaining portion.

DESCRIPTION OF THE ACCOMPANYING DRAWINGS

FIG. 1 is a sectional view of a conventional lens holding device as disclosed in U.S. Pat. No. 5,117,311;

DESCRIPTION OF THE EMBODIMENTS

Figure 1:
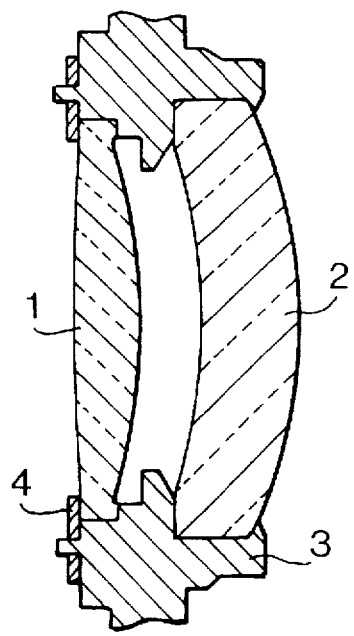
Figure 2:
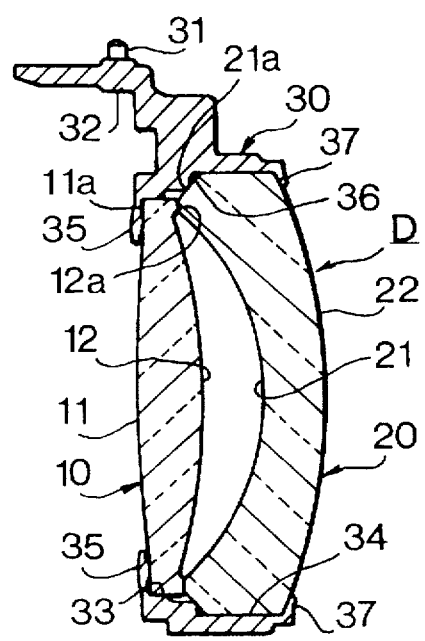
FIG. 2 is a sectional view of an embodiment of a lens holding device according to the present invention.

FIG. 2 shows an embodiment of a lens holding device D according to the present invention.

The device D incorporates a resin plastic lens 10, a glass lens 20, and a resin plastic lens frame 30. The device D is, for example, applicable to a rear lens group of a two-group zoom lens system of a zoom compact camera.

Figure 3:
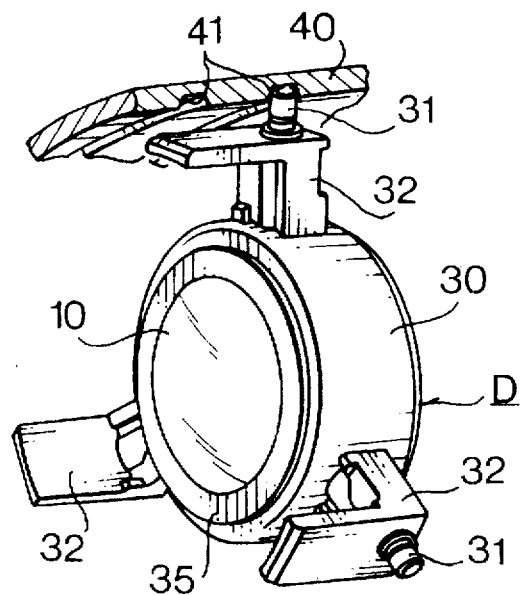
FIG. 3 is a perspective view of the embodiment of a lens holding device according to the present invention.

As shown in FIG. 3, the lens frame 30 includes three arms 32 extending at equal intervals about the periphery of the frame 30. A cam follower 31 is provided at the tip of each arm 32. The cam followers 31 engage with cam grooves 41 formed on the inner surface of a cam ring 40 surrounding the lens frame 30. The engagement of the cam grooves 41 and the cam followers 31 enables the lens frame 30 to be moved in the direction of the optical axis of the lenses 10 and 20 as the cam ring 40 rotates relative to the lens frame 30.

The resin lens 10 is, for example, a double convex lens. The object side surface 11 (the left hand side surface in FIG. 2) is a gently curved convex surface, and the image side surface 12 (the right hand side surface in FIG. 2) is a steeply curved convex surface. Front mounting portion 11a and rear mounting portion 12a are flattened outer peripheral areas (not optically functional) of the refraction surfaces 11 and 12 of the lens 10.

The glass lens 20 is a meniscus lens, having a larger diameter than the resin plastic lens 10. The object side surface 21 (left hand side surface in FIG. 2) is a steeply curved concave surface, and the image side surface 22 (right hand side surface in FIG. 2) is a gently curved convex surface. An inclined surface 21a is formed in the outer peripheral area of the refraction surface 21, both for reducing the length along the optical axis, and for providing a positioning reference. A tip portion 21a' (see FIG. 4) of the inclined surface 21a is provided as a second positioning reference, for contacting, pressing, and positioning the plastic lens 10. When the glass lens 20 is held in the frame 30, the inclined surface 21a contacts a mating reference projection 36a provided on the lens frame 30.

A second cylindrical lens holding portion 33 is formed on the lens frame 30 towards the object side. The second (cylindrical) lens holding portion 33 is sized to allow slip-fitting of the plastic lens 10. A first cylindrical lens holding portion 34 for holding at least one glass lens having a larger diameter than the plastic lens 10 is formed towards the image side of the frame 30. The first (cylindrical) lens holding portion 34 is of a larger diameter than the second lens holding portion 33, and is stepped into the second lens holding portion 33. In this embodiment, a single glass lens 20, having a larger diameter than the plastic lens 10, is held in the first lens holding portion 34.

An elastic holding ring 35 is formed at the object side edge of the second lens holding portion 33. The elastic holding ring 35 is elastically deformable in the direction of the optical axis, and takes only a small force to be deflected. As shown in enlarged view of FIG. 4, the elastic holding ring 35 is formed as shown by a double-dotted line, and is in this position when the resin plastic lens 10 is not held in the frame 30. When all the lenses are held in the frame 30, the elastic holding ring 35 is deformed as it is pushed by the plastic lens 10 into the position shown by a solid line. Thus, the plastic lens 10 is held against the glass lens 20 by the elastic force of the elastic holding ring 35. The plastic lens 10 has a known limit of mechanical deformation acceptable for proper optical performance, and the elastic holding ring elastically holds the resin plastic lens 10 against said the glass lens 20 with a force of less than the known limit.

A stepped portion 36 is formed between the second lens holding portion 33 and the first holding portion 34. A reference projection 36a is formed on the stepped portion 36. The position of the glass lens 20 is accurately set with reference to the frame 30 as the reference projection 36a abuts the inclined surface 21a (first positioning reference). Furthermore, the position of the plastic lens 10 is accurately set with reference to the glass lens 20, and thence to the frame 30, as the flattened rear mounting portion 12a abuts the tip portion 21a' (second positioning reference).

The lenses are all inserted in the frame 30 from one side. In the embodiment, the lenses are inserted in the frame 30 from the image side (right hand side).

Figure 4:
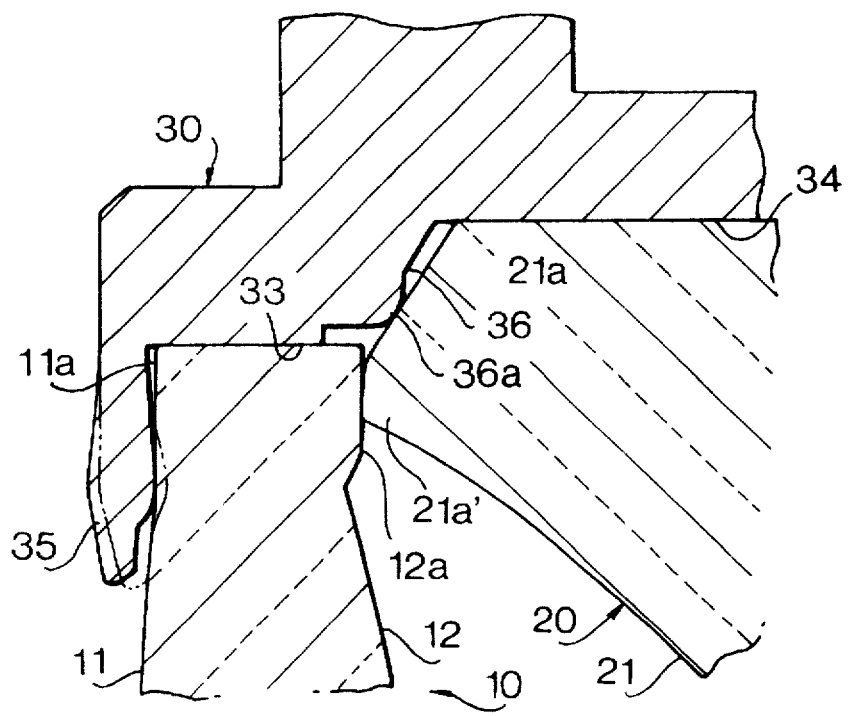
FIG. 4 is a detailed sectional view of a reference surface and resilient portion of the embodiment of a lens holding device according to the present invention.

First, the plastic lens 10 is inserted into the second holding portion 33, and is kept where the elastic holding ring 35 is in the position shown by the double-dotted line in FIG. 4. That is, the plastic lens is kept in a position rightward of the designed position by the elastic holding ring 35. The glass lens 20 is then inserted in the first holding portion 34. As the glass lens 20 is inserted, the tip portion 21a' of the glass lens 20 contacts the rear mounting portion 12a of the plastic lens and pushes the plastic lens 10 leftward. As the glass lens 20 is pushed further, the front mounting portion 11a of the plastic lens 10 pushes and deflects the elastic holding ring 35 outwards (leftward in FIG. 4). When the inclined surface 21a' contacts the reference projection 36a, the leftward movement of the glass lens 20 is prevented. At this stage, both the lenses 10 and 20 are properly located at designed positions, by the contact of the inclined surface 21a to the reference projection 36a, and by the contact of the rear mounting portion 12a to the tip portion 21a', respectively.

Under this condition, i.e., when the inclined surface 21a of the glass lens 20 contacts the position adjusting projection 36a, the glass lens is secured at the edge 37 of the frame at the image aide (right hand side in FIG. 4). The two lenses 10 and 20 are thereby accurately and properly positioned and held in the frame 30. In this embodiment, the edge 37 of the image side portion of the frame 30 is plastically deformed with heat to form a lens holding portion.

The inclined surface 21a abuts the reference projection 36a, and the glass lens 20 is therefore properly positioned with reference to the frame 30. The resin plastic lens 10 is positioned with reference to the glass lens 20, and therefore to the frame 30. Furthermore, the elastic holding ring 35 ensures that the glass lens 20 does not apply undue force to the resin plastic lens 10. Thus, both the plastic lens 10 and the glass lens 20 are properly positioned in the frame 30, and the resin plastic lens 10 is not deformed by external forces applied by the frame or by the glass lens 20. A single securing operation is needed to secure all the lenses, that at the image side edge 37 of the frame 30.

In the above-described embodiment, the frame 30 is made of resin, and when the lenses are secured in the frame 30, the edge 37 of the frame is plastically deformed under heat. However, any other method to secure the lenses can be applied if it does not depart from the essential characteristics of the invention. For example, if it is preferable not to plastically deform the frame, the lenses can be held by attaching a ring member at the edge 37. In this case, only a single securing operation is needed. If the frame is made of metal, mechanical plastic deformation can be applied to the edge 37.

According to the invention, since all of a plurality of plastic and glass lenses are inserted from one side of a frame, a retaining member to be provided on the other end side of the frame can be formed unitarily with the frame. This reduces the number of assembling process, as well as the number of parts, when compared with the case where the lenses are inserted from both sides of the frame. Fundamentally, a lens made of resin plastic should not be secured in a frame by means of heat or mechanical plastic deformation of the frame near the plastic lens. According to the invention, as only the side of the frame where the glass lens is positioned is plastically deformed, any securing structure can be employed without damaging or distorting the plastic lens.

The present disclosure relates to subject matter contained in Japanese Patent Application No. HEI 06-175999, filed on Jul. 5, 1994, which is expressly incorporated herein by reference in its entirety.

What is claimed is:

1. A lens holding device, comprising:
   a lens frame, said lens frame having a unitary elastic portion and a reference surface formed on said lens frame;
   a retaining member, provided on said lens frame;
   a first lens, supported by said lens frame and held against said reference surface by said retaining member, in a predetermined position with reference to said lens frame; and
   a second lens, supported by said lens frame and elastically held against said first lens, by said unitary elastic portion of said lens frame, in a predetermined position with reference to said lens frame and to said first lens.

2. The lens holding device according to claim 1,
   wherein said second lens comprises a resin plastic lens and said elastic portion of said lens frame elastically holds said second lens against said first lens with a force of less than a predetermined limit of mechanical deformation, for obtaining acceptable optical performance.

3. The lens holding device according to claim 2,
   wherein said first lens is a glass lens.

4. The lens holding deice according to claim 1,
   wherein said elastic portion comprises a resilient ring-shaped member.

5. The lens holding device according to claim 1,
   wherein said retaining member is unitarily formed with said lens frame, and said first lens is substantially rigidly held against said reference surface by plastically deforming said lens frame to form said retaining member.

6. The lens holding device according to claim 5,
   wherein said lens frame is formed from resin, and said lens frame is plastically deformed under heat to form said retaining member.

7. The lens holding device according to claim 1,
   wherein said lens frame has a stepped bore with first and second inner diameter portions, first and second lens mounting portions being defined in said lens frame, said first lens mounting portion comprising a portion of said stepped bore of larger diameter than said second lens mounting portion; and
   wherein said reference surface is positioned between said first and second lens mounting portions facing substantially towards said first lens mounting portion.

8. The lens holding device according to claim 7
   wherein said first lens has a larger diameter than said second lens, and said first lens is supported in said first lens mounting portion while said second lens is supported in said second lens mounting portion.

9. The lens holding device according to claim 8,
   wherein said elastic portion is formed in said lens frame on a side of said second lens mounting portion opposite said reference surface, and said retaining member is provided to said lens frame on a side of said first lens mounting portion opposite said reference surfaces.

10. The lens holding device according to claim 9,
    wherein said elastic portion comprises a resilient ring-shaped member of a smaller diameter than said second lens mounting portion and said second lens.

11. The lens holding device according to claim 9,
    wherein said retaining member comprises a substantially rigid ring-shaped member of a smaller diameter than said first lens mounting portion and said first lens.

12. The lens holding device according to claim 9,
    wherein a stepped portion, having a diameter between that of said first and second lens mounting portions, is located between said first and second lens mounting portions, and said reference surface comprising an annular projection on said stepped portion extending towards said first lens.

13. A lens holding device, comprising:
    a lens frame, said lens frame having a unitary elastic portion and a reference surface formed on said lens frame;
    a glass lens, having a reference surface formed thereon;
    a resin lens; and
    a retaining member, provided to said lens frame,
    wherein said glass lens is held against said reference surface of said lens frame by said retaining member, and said resin lens is elastically held against said reference surface of said glass lens by said elastic portion.

14. The lens holding device according to claim 13, wherein said elastic portion comprises a ring-shaped resilient portion of said lens frame.

15. The lens holding device according to claim 14, wherein said glass lens is of a larger diameter than said plastic lens.

16. The lens holding device according to claim 13, wherein said retaining member substantially rigidly holds said first lens in abutting rotation to said reference surface.

17. The lens holding device according to claim 16, wherein said retaining member is unitarily formed with said lens frame, and said first lens is rigidly held against said reference surface by plastically deforming said lens frame to form said retaining member.

18. The lens holding device according to claim 17, wherein said lens frame is formed from resin, and said lens frame is plastically deformed under heat to form said retaining member.

19. A lens holding device, comprising:

a lens frame, having first and second lens mounting portions formed thereon; a reference surface substantially facing said first lens mounting portion and formed between said first and second lens mounting portions; and an elastic ring formed in said lens frame on a side of said second lens mounting portion and opposite said first lens mounting portion;

a first lens, provided in said first lens mounting portion and in abutting relation to said reference surface;

a second lens, provided in said second lens mounting portion and resiliently held in abutting relation to said first lens by said elastic ring; and a retaining portion, provided on a side of said first lens mounting portion opposite said second lens mounting portion, and holding said first lens in abutting relation to said reference surface.

20. The lens holding device according to claim 19, wherein said first lens is of a larger diameter than said second lens, and said first lens mounting portion is of larger internal diameter than said second lens mounting portion.

21. The lens holding device according to claim 20, wherein said retaining portion substantially rigidly holds said first lens in abutting relation to said reference surface.

22. The lens holding device according to claim 21, wherein said retaining portion is unitarily formed with said lens frame, and said first lens is held against said reference surface by plastically deforming said lens frame to form said retaining portion.

23. The lens holding device according to claim 22, wherein said lens frame is formed from resin, and said lens frame is plastically deformed under heat to form said retaining portion.

* * * * *

UNITED STATES PATENT AND TRADEMARK OFFICE
CERTIFICATE OF CORRECTION

PATENT NO. : 5,757,559
DATED : May 26, 1998
INVENTOR(S) : H. NOMURA et al.

It is certified that error appears in the above-identified patent and that said Letters Patent is hereby corrected as shown below:

On the cover page, item [73] Assignee, line 1, change "Kabushi Ki" to ---Kabushiki---.

At column 6, line 7 (claim 4, line 1) of the printed patent, change "holding deice" to ---holding device---.

At column 7, line 12 (claim 16, line 3) of the printed patent, change "abutting rotation" to ---abutting relation---.

Signed and Sealed this

First Day of June, 1999

Attest:

Q. TODD DICKINSON

*Attesting Officer*  *Acting Commissioner of Patents and Trademarks*